a resin sliding bearing includes: a bearing surface for slidingly bearing a shaft; and a hollow that communicates with the bearing surface through to a different surface of the bearing.

(12) United States Patent
Ehara et al.

(10) Patent No.: US 11,681,254 B2
(45) Date of Patent: Jun. 20, 2023

(54) RESIN SLIDING BEARING AND IMAGE FORMING APPARATUS

(71) Applicant: Konica Minolta, Inc., Tokyo (JP)

(72) Inventors: Yoshinobu Ehara, Hino (JP); Hajime Mori, Fuchu (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/698,035

(22) Filed: Mar. 18, 2022

(65) Prior Publication Data
US 2022/0299932 A1 Sep. 22, 2022

(30) Foreign Application Priority Data

Mar. 18, 2021 (JP) .............................. JP2021-045104

(51) Int. Cl.
| | |
|---|---|
| *G03G 15/08* | (2006.01) |
| *G03G 21/16* | (2006.01) |
| *F16C 33/20* | (2006.01) |
| *F16C 33/74* | (2006.01) |
| *F16C 17/02* | (2006.01) |

(52) U.S. Cl.
CPC .......... *G03G 21/1647* (2013.01); *F16C 17/02* (2013.01); *F16C 33/20* (2013.01); *F16C 33/74* (2013.01); *G03G 15/08* (2013.01)

(58) Field of Classification Search
CPC .... G03G 15/08; G03G 15/80; G03G 21/1647; G03G 2221/1648; F16C 33/20; F16C 33/74; F16C 17/02; F16C 23/04; F16C 27/02; F16C 33/201; F16C 37/00; F16C 2208/66; F16C 2208/76; F16C 2240/42; F16C 2370/38
See application file for complete search history.

(56) References Cited

U.S. PATENT DOCUMENTS

| | | | | |
|---|---|---|---|---|
| 2014/0254963 | A1* | 9/2014 | Blair | ...................... F16C 17/028 384/115 |
| 2019/0317424 | A1* | 10/2019 | Koga | .................. G03G 15/0813 |
| 2021/0364950 | A1* | 11/2021 | Kawashima | ....... G03G 15/0889 |

FOREIGN PATENT DOCUMENTS

| | | | |
|---|---|---|---|
| JP | 2019191452 A | 10/2019 | |
| WO | WO-2019142843 A1 * | 7/2019 | .............. F16C 33/20 |

* cited by examiner

*Primary Examiner* — Sophia S Chen
(74) *Attorney, Agent, or Firm* — Cantor Colburn LLP

(57) ABSTRACT

A resin sliding bearing includes: a bearing surface for slidingly bearing a shaft; and a hollow that communicates with the bearing surface through to a different surface of the bearing.

12 Claims, 4 Drawing Sheets

RESIN SLIDING BEARING AND IMAGE FORMING APPARATUS

CROSS-REFERENCE TO RELATED APPLICATIONS

The present invention claims priority under 35 U.S.C. § 119 to Japanese Patent Application No. 2021-045104 filed on Mar. 18, 2021, the entire contents of which being incorporated herein by reference.

TECHNICAL FIELD

The present invention relates to a sliding bearing and an image forming apparatus.

BACKGROUND

Rolling bearings with a boll or a roller are popular as bearings for rotatably bearing a shaft. Sliding bearings, on the other hand, are also often used at parts (mechanisms) where granular materials may penetrate into the mechanism. The sliding bearings are also used because of its simple structure, in consideration of cost and sizes.

As for materials, sliding bearings made of resin, which is highly flexible in shape, are also popular so as to make the bearings fittable to its adjacent members or to give a sealing capability (for example, JP2019-191452A), although metal bearings are also widely used.

SUMMARY

However, under some conditions, known resin bearings may be deformed by the sliding heat, thereby having a decreased rotational capability.

The present invention has been conceived in view of the above issue. An object of the present invention is to increase the cooling capability and retain high rotational capability of a resin sliding bearing.

To achieve at least one of the abovementioned objects, according to an aspect of the present invention, A resin sliding bearing including:

a bearing surface for slidingly bearing a shaft; and a hollow that communicates with the bearing surface through to a different surface of the bearing, the different surface being different from the bearing surface.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DESCRIPTION OF EMBODIMENTS

Hereinafter, an embodiment of the present invention will be described with reference to the drawings. The following embodiment of the present invention is not intended to limit the present invention.

Figure 1:
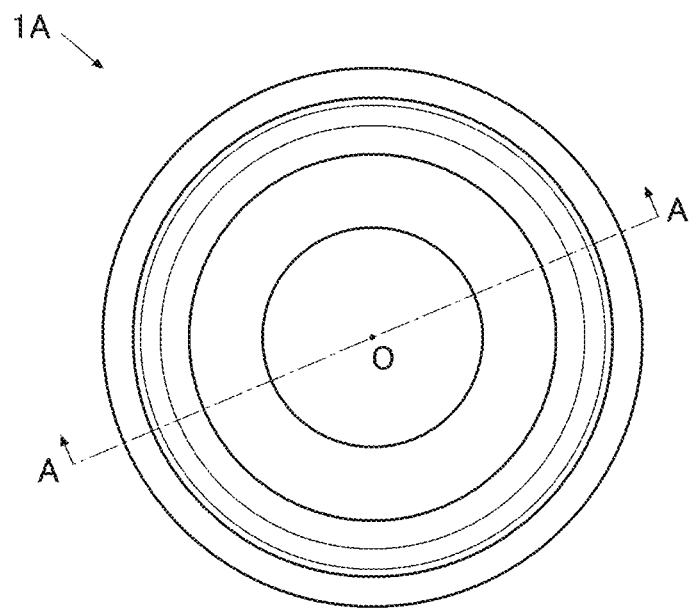
FIG. 1 is a top view of a resin plain bearing according to an embodiment of the present invention.
Figure 2:
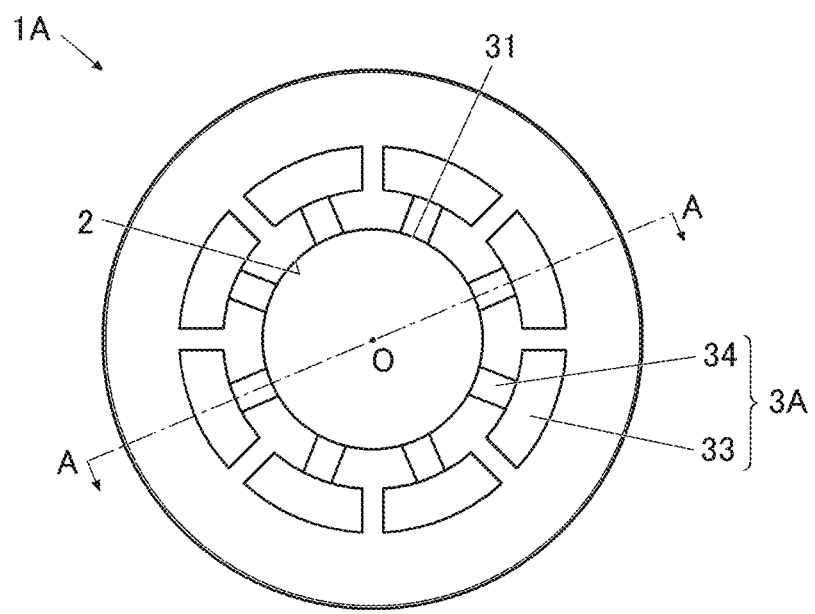
FIG. 2 is a bottom view of the resin sliding bearing according to the embodiment of the present invention.
Figure 3:
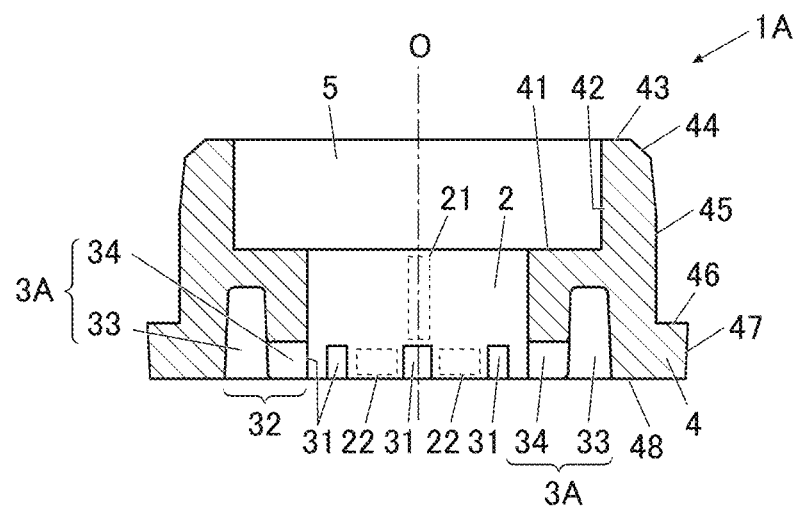
FIG. 3 is a cross section (corresponding to A-A in FIG. 1 and FIG. 2) of the resin sliding bearing including the central shaft thereof according to the embodiment of the present invention.

FIG. 1 shows the top view of a resin sliding bearing 1A, and FIG. 2 shows the bottom view thereof according to this embodiment. FIG. 3 shows the cross section of the resin sliding bearing 1A including the central axis O. In the description, the side having a flange 4 is assumed to be the bottom, and the opposite side is assumed to be the top. However, this does not indicate the orientation of the sliding bearing fitted for use.

The innermost circumferential surface of the sliding bearing 1A is the bearing surface 2 for slidingly bearing a shaft, as shown in FIG. 1 to FIG. 3. The shaft to be held is inserted to the bearing surface 2 and borne by the sliding bearing 1A.

The sliding bearing 1A also has a hollow(s) 3A that communicates with the bearing surface 2 and a surface other than the bearing surface 2. The surfaces of the sliding bearing 1A other than the bearing surface 2 include: the lower end surface (axial-direction end surface) 41, the upper internal circumferential surface 42, the top end surface (axial-direction end surface) 43, the external taper surface 44, the external circumferential surface 45, the flange top surface 46, the flange external circumferential surface 47, and the bottom end surface (axial-direction end surface) 48.

Figure 4:
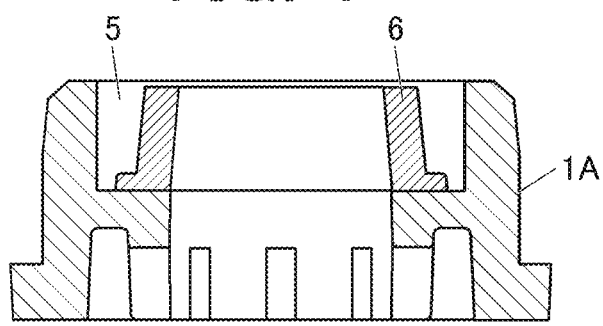
FIG. 4 is the sliding bearing in FIG. 3 combined with a seal part.

The upper internal circumferential surface 42 and the bearing surface 2 have the same central axis. The diameter of the upper internal circumferential surface 42 is greater than the diameter of the bearing surface 2. The inside of the upper internal circumferential surface 42 is an internal space 5. As shown in FIG. 4, the internal space 5 is a space in which the seal part 6 is set. The seal part 6 may or may not be set in the internal space 5. The internal space 5 (upper internal circumferential surface 42) may not be formed no matter whether the seal part 6 is set (e.g., structure shown in FIG. 5).

In this embodiment, the hollow 3A communicates with the bearing surface 2 and the bottom end surface 48. The hollow 3A extends from a bearing-surface-side opening 31 to a bottom-side opening 32. The bearing-surface-side opening 31 connects to the bearing surface 2 of the hollow 3A.

The hollow 3A includes an internal space (hereinafter called "thickness reduction part") 33 for restraining surface sinks that may occur in molding resin into parts including the bearing surface 2. "Molding resin into parts including the bearing surface 2" refers to molding resin into the sliding bearing 1A shown in FIG. 1 to FIG. 3. The parts mentioned above do not include a part that is separately formed and combined with the sliding bearing 1A, such as the seal part 6 in FIG. 4.

The hollow 3A includes an airway 34 that connects the thickness reduction part 33 and the bearing surface 2. The airway 34 is cut open to the bottom end surface 48. That is, the bearing-surface-side opening 31 is cut open to the bottom end surface 48.

The thickness reduction part 33 is open to the bottom end surface 48.

In the above structure as an example, the bearing-surface-side opening 31 of the hollow 3A is adjacent to part of the bearing surface 2 (21, 22) in the axial direction and the circumferential direction of the bearing surface 2.

The sliding bearing 1A is connected in a loop in the circumferential direction of the bearing surface 2. This allows the sliding bearing 1A to retain a high level of rigidity. The bearing surface 2 is not deformed easily, and the sliding bearing 1A can hold the shaft accurately.

Multiple hollows 3A are formed in the circumferential direction of the bearing surface 2 in a dispersed manner. This allows the plain bearing 1A to have uniform cooling capability and hold the shaft in a balanced manner. It is therefore preferable that multiple hollows 3A be formed in a dispersed manner at regular intervals around the central axis O.

In the sliding bearing 1A, each hollow 3A may communicate with the other surface(s): the lower end surface 41 and/or the bottom end surface 48 that are adjacent to the bearing surface 2. This is because the external circumferential surface 45 is often blocked by the bearing holder 10 (FIG. 5).

In the sliding bearing 1A, each hollow 3A may communicate with the bottom end surface 48 among two end surfaces 41, 48 (the lower end surface 41 and the bottom end surface 48) that are adjacent to the bearing surface 2. As the hollows 3A do not pass through in the axis direction, the sliding bearing 1A can have the sealing capability.

Figure 5:
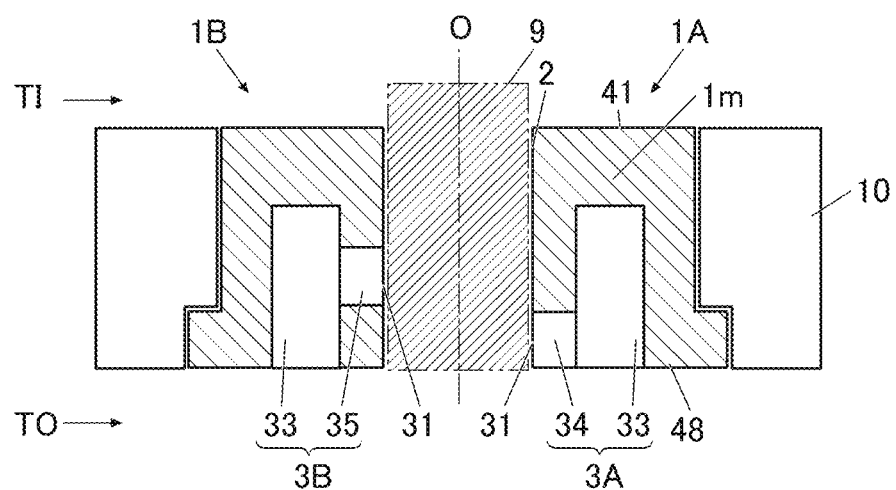
FIG. 5 is a cross section of the resin sliding bearing, the shaft, and the holder including the central axis according to the embodiment of the present invention, wherein the left half shows the case where an airway(s) (hollow) is a hole and the right half shows the case where the airway(s) (hollow) is a groove.
Figure 6:
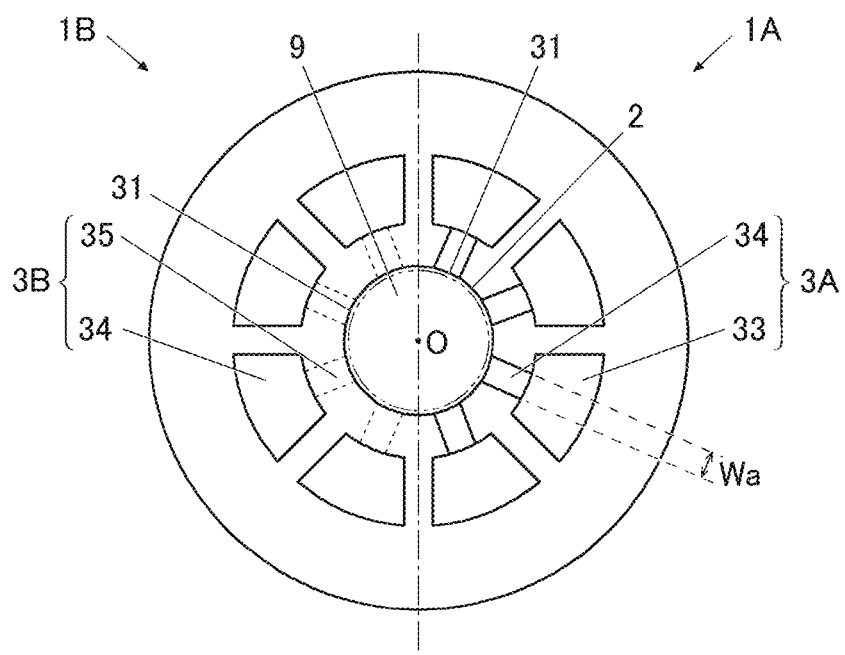
FIG. 6 is a bottom view of the resin sliding bearing and the shaft according to the embodiment of the present invention, wherein the left half shows the case where an airway(s) (hollow) is a hole and the right half shows the case where the airway(s) (hollow) is a groove.

The sliding bearing may have hollows (hollows 3B) having hole-shape airways 35 instead of the above-described airways 34, as shown in the left half of the cross section in FIG. 5 and the left half of the bottom view in FIG. 6 (sliding bearing 1B). However, the hollows 3A are easier to form than the hollows 3B. The entire hollows 3A can be formed with a single mold, whereas the entire hollows 3B need to be formed with divided molds.

The bearing surface 2 is made of resin material only. As shown in FIG. 5, the shaft 9 is inserted into the sliding bearing 1A. When the shaft 9 rotates, the external circumferential surface of the shaft 9 slides on the bearing surface 2. Thus, the sliding bearing 1A holds the shaft 9 such that the shaft 9 is rotatable. Sliding heat is generated between the external circumferential surface of the shaft 9 and the bearing surface 2.

Figure 7:
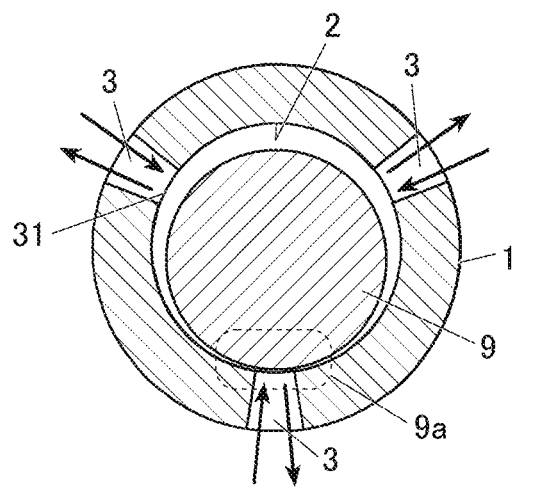
FIG. 7 is a schematic view to explain how the sliding heat is radiated by replacement of air in the sliding bearing according to the present invention.

As the hollows 3A communicate with the bearing surface 2 and the bottom end surface 48, the air near the bearing surface 2 is replaced through the open (not covered) bottom-surface-side opening 32. This facilitates radiation of sliding heat via air as a medium. As shown in the schematic view in FIG. 7, the radial load on the shaft 9 may become unbalanced and the heated part 9a may be concentrated on a certain area. As the resin sliding bearing 1 has the hollows 3 for air replacement, the air inside the sliding bearing 1 is replaced through the hollows 3. This facilitates radiation of sliding heat via air as a medium.

Thus, the resin sliding bearing 1 obtains the increased cooling capability while restraining heat deformation or other problems. The sliding bearing 1 can therefore retain a preferable rotational capability.

As described above, the bearing surface 2, which consists only of resin material, can retain the preferable rotational capability.

As part of each hollow 3 is the thickness reduction part 33, the sliding bearing 1 can restrain surface sinks in resin molding and retain the cooling capability when the bearing is in use.

Figure 8:
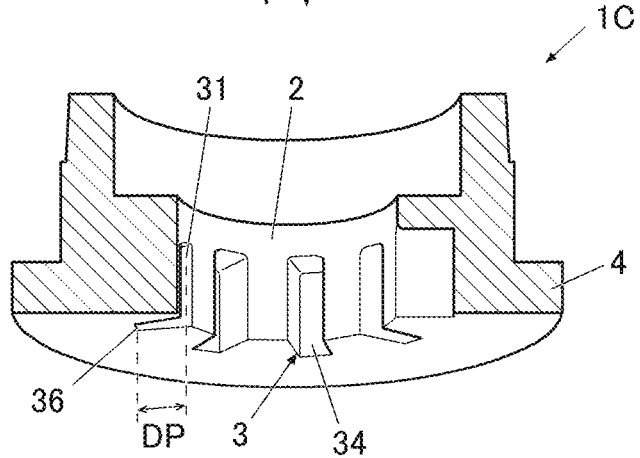
FIG. 8 is a cross-sectional perspective view of the resin sliding bearing according to another embodiment of the present invention.

The resin sliding bearing may not have parts corresponding to the thickness reduction parts 33, as shown by the resin sliding bearing 1C in FIG. 8. The resin sliding bearing 1C can also obtain the cooling capability.

The resin material of the sliding bearing 1 may be olefinic resin (e.g., polypropylene (PP), polyethylene (PE)), polyacetal (POM), polyphenylenesulfide (PPS), or polyamide (PA).

The sliding bearing is applicable to an image forming apparatus, as described below.

The sliding bearing is applied to an image forming apparatus with an electrophotographic image former that develops electrostatic latent images using toner. Any of the above-described sliding bearings 1A, 1B, 1C is applied to a part where toner leakage should be prevented.

As shown in FIG. 5, the sliding bearing 1 is positioned at the boundaries between the toner space TI where the toner is placed and the external space TO so as to hold the shaft 9 that passes through the toner space TI and the external space TO. Among the end surfaces 41, 48 of the sliding bearing 1 (1A, 1B), the lower end surface 41, which is separate from the hollow 3 (3A, 3B) with a resin part 1m inbetween, is positioned at the toner space TI side. This prevents blockage of the hollows 3 (3A, 3B) with toner, which results in failure to replace air. The toner space TI is the space inside a device that carries and stirs toner. The toner space TI is, for example, the internal space of a developing device, a toner supplying device, or a toner ejecting device. The shaft 9 is a shaft of a screw that carries and/or stirs toner, for example. The shaft 9 receives power of a motor placed in the external space TO.

The bottom-side opening 32 is left open without a lid or the like, as described above. More specifically, the internal space of each hollow 3, which connects to the shaft 9 through the bearing-surface-side opening 31, communicates with the external space TO outside the hollow 3 through the bottom-surface-side opening 32 (opening at the surface side other than the bearing-surface 2 side) such that air can flow between the internal space of each hollow 3 and the external space TO. Such air replacement through the hollows 3 yields a cooling effect.

To increase the capability to seal toner, the sliding bearing 1 may be provided with the seal part 6, as shown in FIG. 4.

It is preferable that the resin material of the sliding bearing 1 be a material to which toner is less adhesive, in order to avoid adhesion of toner to the sliding bearing 1 and resulting problems, such as decrease in rotational capability. Preferably, the material may be olefinic resin (PP, PE), for example.

<Example Experiment 1>

Herein, the example experiment 1 for checking the cooling effect is disclosed. As shown in TABLE I, in the example experiment 1, seven kinds of φ6 mm sliding bearings were created with polypropylene (PP) or polyacetal (POM). The seven kinds of sliding bearings include comparative examples that are made of PP and POM, respectively and that do not have the airways 34, 35 (number of airways: zero). As examples of the present invention, the following were created: three kinds of sliding bearings 1B that are made of PP and that have one hole airway, three hole airways, and eight hole airways, respectively; one kind of sliding bearing 1A that is made of PP and that has eight groove airways; and one kind of sliding bearing 1A that is made of POM and that has eight groove airways. Herein, the number of airways is equal to the number of hollows. For the examples having multiple airways, the hollows (3A, 3B) for air replacement were formed in a disperse manner at regular intervals in the circumferential direction.

The following were further created: two kinds of resin sliding bearings 1C that have eight groove airways, that do not have parts corresponding to the thickness reduction parts 33 as shown in FIG. 8, and that have different depths of grooves DP (20 μm, 10 μm) with respect to the bearing surface 2. As shown in FIG. 8, the depth DP of grooves from the bearing surface 2 is measured in the radial direction from the bearing-surface-side opening 31 to the end 36.

The shaft 9 with φ6 mm and made of polycarbonate (PC) was inserted to the respective sliding bearings and rotated at 500 rotations per minute under 3N radial load. TABLE I shows the evaluation result of the deformation amount of the respective bearings.

As for the types of airways, the hole-shape airways 35 and the groove-shape airways 34 both yielded a cooling effect regardless of the difference in shape. Therefore, it turned out that the sliding bearing 1A with the groove-shape airways 34, which are easy to form, compares favorably in cooling effects.

As for the depth DP of each hollow 3 from the bearing surface 2, it turned out that the depth DP equal to or greater than 20 μm yielded sufficient cooling effects. When the depth DP is around 20 μm, the sliding bearing 1 may have groove-shape hollows 3 without the thickness reduction part 33, or the sliding bearing 1 may have both the groove-shape hollows 3 and the thickness reduction part 33 that are separate from each other. The hollows 3 with the depth DP of around 20 μm would look much shallower than the hollows shown in FIG. 8.

<Example Experiment 2>

The example experiment 2 for checking the rotational capability is disclosed.

Figure 9:
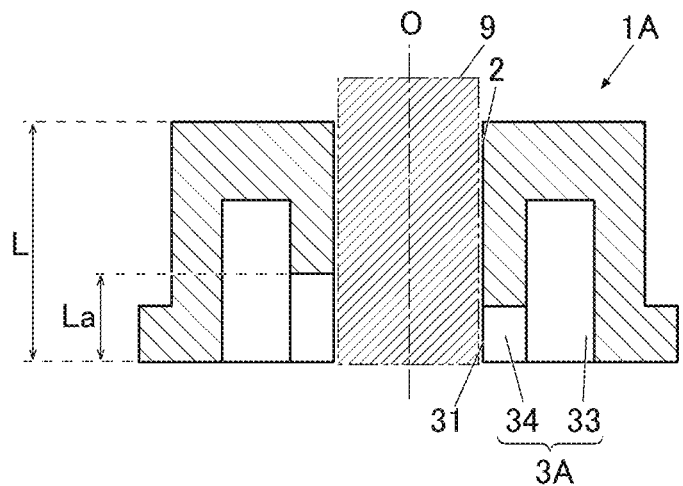
FIG. 9 is a cross section of the sliding bearing including the central axis of the shaft for explaining an example experiment 2.
Figure 10:
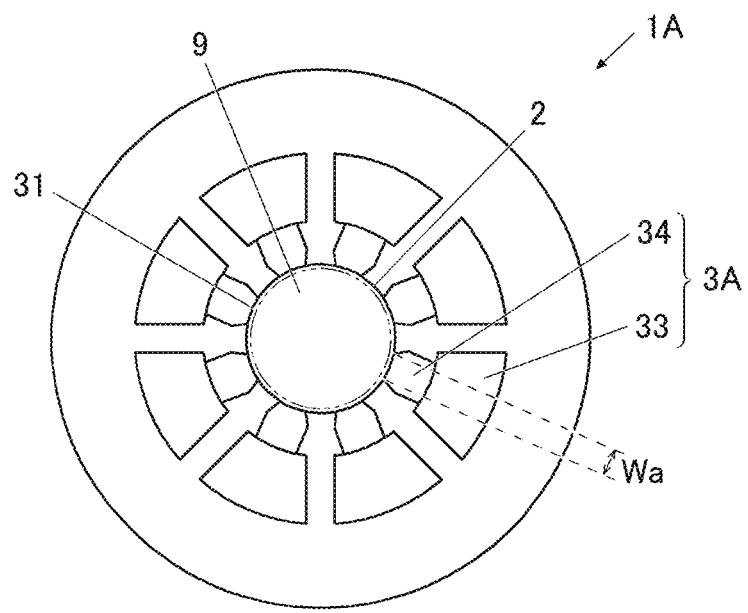
FIG. 10 is a bottom view of the sliding bearing with airways (hollows) that have narrowed openings at the bearing surface side.

In the example experiment 2, the sliding bearings 1A, which have groove-type airways 34, were created as with the example experiment 1. In the example experiment 2, seven kinds of sliding bearings 1A were created by changing the opening length La (see FIG. 9), the opening width Wa (see FIG. 6 and FIG. 10), and the edge shape of the openings. The edge shapes of the openings were either a straight type or a narrowing type. As shown in FIG. 6, the straight type airway 34 has a uniform straight-shaped section. As shown in FIG. 10, the narrowing type airway 34 is narrowed at the bearing-surface-side opening 31. The internal lateral surface of each hollow 3 and the bearing surface 2 constitute the edge of the bearing-surface-side opening 31. For the straight type, the angle between the internal lateral surface of the hollow 3 and the bearing surface 2 is the right angle. For the narrowing

TABLE I

| | | BEARING MATERIAL | | | | | | | | |
| | | PP | | | | | | | POM | |
| AIRWAY | NUMBER | 0 | 1 | 3 | 8 | 8 | 8 | 8 | 0 | 8 |
| | TYPE | — | HOLE | HOLE | HOLE | GROOVE | GROOVE | GROOVE | — | GROOVE |
| | DEPTH DP | — | — | — | — | — | 20 μm | 10 μm | — | — |
| EVALUATION RESULT | DEFORMATION AMOUNT | 15 μm | 10 μm | 2 μm | 2 μm | 2 μm | 2 μm | 5 μm | 15 μm | 2 μm |

Deformation of the bearing is caused by sliding heat and load. The greater the sliding heat is, the greater the deformation amount is. When the sliding heat exceeds a certain level, the surface of the bearing melts. In the example experiment 1, the deformation amount was used as an index of sliding heat for comparison because it is difficult to directly measure the temperature.

PP and POM were selected and evaluated because of their high abrasion resistance as compared with other general-purpose resins.

As shown in TABLE I, the deformation amounts of the present invention examples were less than the deformation amounts of the comparative examples. This experiment showed that the bearings made of PP and POM both obtained a cooling effect by having the hollows (3A, 3B) for air replacement.

The experiment further showed that the cooling effect increased with a greater number of hollows (3A, 3B) for air replacement and that three or more hollows yielded sufficient cooling effect.

type, the angle between the internal lateral surface of the hollow 3 and the bearing surface 2 is an acute angle.

The created sliding bearings 1A have the following common features: (i) eight airways, (ii) made of polypropylene (PP), (iii) for φ6 mm, and (iv) the bearing length L of the sliding bearing 1A is 3 mm.

As with the example experiment 1, the number of airways is equal to the number of hollows. The eight hollows 3A for air replacement were formed in a dispersed manner at regular intervals in the circumferential direction, as shown in FIG. 2, FIG. 6, and FIG. 10.

The shaft 9 has φ6 mm and is made of polycarbonate (PC). The shaft 9 was inserted to the respective sliding bearings and rotated at 500 rotations per minute under 3N radial load. TABLE II shows the result of evaluating the deformation amounts of the respective bearings, as with the example experiment 1. TABLE II also shows the result of detecting axial shifts.

TABLE II

| | | BEARING MATERIAL PP | | | | | | |
|---|---|---|---|---|---|---|---|---|
| CHECK POINT | | EFFECT OF OPENING WIDTH | | | | OPENING LENGTH/ OPENING AREA | | EDGE SHARPNESS |
| AIRWAY | EDGE SHAPE OF OPENING | RIGHT ANGLE | RIGHT ANGLE | RIGHT ANGLE | RIGHT ANGLE | RIGHT ANGLE | RIGHT ANGLE | ACUTE ANGLE |
| | OPENING LENGTH | 1 | 1 | 1 | 1 | 2 | 2 | 1 |
| | OPENING WIDTH | 0.1 | 0.5 | 0.7 | 0.9 | 0.15 | 0.6 | 0.5 |
| | OPENING AREA | 0.1 | 0.5 | 0.7 | 0.9 | 0.3 | 1.2 | 0.5 |
| | OPENING WIDTH (%) | 0.04 | 0.21 | 0.30 | 0.38 | 0.06 | 0.25 | 0.21 |
| EVALUATION RESULT | DEFORMATION AMOUNT | 2 μm | 2 μm | 2 μm | — | 2 μm | 2 μm | MELTED |
| | SHAFT SHIFT | ○ | ○ | ○ | Δ | ○ | ○ | — |

Capability to hold the shaft is expected to decrease with a longer opening length La at the bearing surface 2, a wider opening width Wa, and a wider opening area.

It turned out that the axial shift was slightly conspicuous when the opening width Wa (total of the opening widths Wa) accounted for approximately 40% of the entire circumference of the bearing surface 2. Therefore, it is preferable that the ratio of lacking parts of the bearing surface 2 (lacking parts because of the bearing-surface-side openings 31) to the entire circumference of the bearing surface 2 in the circumferential direction is equal to 30% or less. More specifically, the bearing can slidingly support and bear the shaft while restraining shift of the shaft when the opening width Wa at the bearing surface 2 is designed such that the total of the opening width Wa accounts for 30% or less of the entire circumference of the bearing surface 2.

It also turned out that the cooling effect of the hollows 3 is not affected by the opening length or the opening area (opening length×opening width).

On the other hand, it turned out that the bearing surface 2 melts when the opening edges at the bearing surface 2 have an acute angle. This is supposed to be due to a locally high surface pressure caused by the acute edges of the openings at the bearing surface 2. It is therefore preferable that the angle between the internal lateral surface of each hollow 3 and the bearing surface 2, which form an edge of each bearing-surface-side opening 31, be the right angle or an obtuse angle.

As described above, the resin sliding bearing according to this embodiment can obtain the cooling effect with the hollows 3 (3A, 3B) that communicate with the bearing surface 2 for air replacement. The cooling effect restrains deterioration and deformation of resin on or near the bearing surface 2.

Further, compact sliding bearings with sealing capability can be produced at lower cost.

The above embodiment is an example for explaining the present invention. The components of the embodiment can be appropriately changed, reduced, or new components may be added without departing from the scope of the present invention.

In the above embodiment, the sealing capability is taken into account. However, if the sealing capability is not required, the bearing can be appropriately modified from the above embodiment. For example, the hollows 3 may pass through in the axial direction of the sliding bearing 1, or the hollows 3 may be formed separately at the ends of the bearing in the axial direction.

Further, according to the above embodiment, one continuous hollow 3 (3A, 3B) have one opening to the bearing-surface-side opening 31 and one opening to the other opening 32. However, one continuous hollow 3 may have multiple openings to the bearing-surface-side opening 31, the other opening 32, or both.

Further, according to the above embodiment, the bearing-surface-side opening 31 of the hollow 3A is adjacent to part of the bearing surface 2 (parts 21, 22) in the axial direction and the circumferential direction of the bearing surface 2. However, such parts 21, 22 are not necessary. For example, the bearing-surface-side opening 31 may be continuous from end to end in the axial direction, or may be in a loop along the circumferential direction.

Further, the above description is not intended to prevent use of the sliding bearing together with other means that cool the sliding bearing or that facilitate radiation of heat.

Although embodiments of the present invention have been described and illustrated in detail, the disclosed embodiments are made for purposes of illustration and example only and not limitation. The scope of the present invention should be interpreted by terms of the appended claims.

What is claimed is:
1. A resin sliding bearing comprising:
 a bearing surface for slidingly bearing a shaft; and
 a hollow that communicates with the bearing surface through to a different surface of the bearing, the different surface being different from the bearing surface;
 wherein the different surface is an axial-direction end surface of the bearing adjacent to the bearing surface.
2. The resin sliding bearing according to claim 1, wherein the bearing is connected in a loop in a circumferential direction of the bearing surface.
3. The resin sliding bearing according to claim 1, wherein a bearing surface-side opening of the hollow is cut open to the axial-direction end surface.
4. The resin sliding bearing according to claim 1, wherein
 the bearing includes multiple hollows each of which is the hollow, and
 the multiple hollows are formed in a dispersed manner in a circumferential direction of the bearing surface.
5. The resin sliding bearing according to claim 4, wherein a number of the multiple hollows is three or more.
6. The resin sliding bearing according to claim 1, wherein
 the hollow includes an internal space for preventing a surface sink of part of the bearing in resin molding, the part including the bearing surface.
7. The resin sliding bearing according to claim 1, wherein the bearing surface is made of resin material only.

8. The resin sliding bearing according to claim 7, wherein the resin material is olefinic resin, polyacetal, polyphenylenesulfide, or polyamide.

9. The resin sliding bearing according to claim 1, wherein
part of the bearing surface is lacking in a circumferential direction owing to a bearing surface-side opening of the hollow, and
the lacking part in the circumferential direction accounts for 30% or less than 30% of a circumference of the bearing surface.

10. The resin sliding bearing according to claim 1, wherein
an angle between an internal lateral surface of the hollow and the bearing surface is a right angle or an obtuse angle, the internal lateral surface and the bearing surface constituting an edge of a bearing surface-side opening of the hollow.

11. The resin sliding bearing according to claim 1, wherein a depth of the hollow from the bearing surface is equal to or greater than 20 micrometers.

12. An image forming apparatus comprising:
an electrophotographic image former that develops an electrostatic latent image with toner; and
the resin sliding bearing according to claim 1, wherein
the resin sliding bearing is positioned at a boundary between a toner space where toner is placed and an external space to hold the shaft passing through the toner space and the external space,
among axial-direction end surfaces of the resin sliding bearing, an axial-direction end surface separate from the hollow with a resin part in between is positioned at the toner space side, and
a space inside the hollow is in contact with the shaft at a bearing surface-side opening of the hollow, and the space inside the hollow communicates with a space outside the hollow through a different surface-side opening of the hollow at the different surface such that air can flow between the space inside the hollow and the space outside the hollow.

* * * * *